US005180624A

United States Patent [19]

Kojima et al.

[11] Patent Number: 5,180,624

[45] Date of Patent: Jan. 19, 1993

[54] INK JET RECORDING PAPER

[75] Inventors: Yutaka Kojima; Takashi Omori, both of Tokyo, Japan

[73] Assignee: Jujo Paper Co., Ltd., Tokyo, Japan

[21] Appl. No.: 699,643

[22] Filed: May 14, 1991

Related U.S. Application Data

[63] Continuation-in-part of Ser. No. 410,465, Sep. 21, 1989, abandoned, which is a continuation-in-part of Ser. No. 246,684, Sep. 20, 1988, Pat. No. 4,877,978.

[30] Foreign Application Priority Data

Sep. 21, 1987 [JP] Japan .................................. 2-36692

[51] Int. Cl.$^5$ ............................................. B32B 9/00

[52] U.S. Cl. .................................. 428/211; 428/195; 428/535; 428/537.5; 346/135.1

[58] Field of Search .................... 346/135.1; 428/195, 428/211, 535, 537.5

[56] References Cited

U.S. PATENT DOCUMENTS 4,900,620 2/1990 Tokita et al. ........................ 428/211

4,902,568 2/1990 Morohosi ........................... 428/195

FOREIGN PATENT DOCUMENTS 3832112 3/1989 Fed. Rep. of Germany .

2620655 3/1989 France .

64-78877 3/1989 Japan .

2210071 6/1989 United Kingdom .

*Primary Examiner*—Patrick J. Ryan

*Assistant Examiner*—W. Krynski

*Attorney, Agent, or Firm*—Sherman and Shalloway

[57] ABSTRACT

This invention concerns an ink jet recording paper characterized by comprising a base layer that contains an internal size, and an ink-receptive layer that is made out of a material having good affinity for inks, wherein the ink-receptive layer is superposed on either one or both sides of the base layer by multi-ply paper-manufacturing process; the structure of the ink jet recording paper is such that it has good ink-absorbency enough to catch up with rapid multi-color printing, and provides high optical image, vivid and uniform image definition, and almost no print through, having desirable paper-like figures and hand feeling.

15 Claims, 1 Drawing Sheet

INK JET RECORDING PAPER

CROSS-REFERENCE TO RELATED APPLICATIONS

This application is a continuation-in-part of Ser. No. 410,465 filed Sep. 21, 1989, now abandoned, which is a continuation-in-part of Ser. No. 246,684, filed Sep. 20, 1988, now U.S. Pat. No. 4,877,978.

FIELD OF THE INVENTION

This invention relates to a recording paper for ink jet printers (hereinafter referred to as ink jet recording paper).

DESCRIPTION OF THE PRIOR ART

Recently, the demand for color printers is on the increase. Particularly, an ink jet printer, one of the non-impact recording systems, is held in high estimation because of its capabilities in comparatively rapid color recording for its simple system. However, there are many problems for obtaining multi-color image exactly in high speed recording.

Considering this from the standpoint of using ink jet recording papers, these papers must have sufficient ink-absorbency and dryability. In order to solve the problems of superposing the plural ink droplets and of increasing the number of ink droplets per unit area, it is required that the ink-absorptive capacity is enough excellent and owing to the high speed recording the rapid drying of the ink after the fixing is necessary. Meanwhile, ink jet recording papers are mainly divided into two groups; one is the plain type ink jet recording paper, which consists of only cellulosic fibers or of cellulosic fibers and a filler in order that inks may be absorbed in the space between fibers or spaces which are formed fiber and filler, and the other is the coated type ink jet recording paper, which consists of paper, a substrate, and coating materials, which consists of pigment and binder, in order that inks may be absorbed in a fine void of the coating layer. Although the coated type recording paper provides a small spread and a circular form of ink dot, as well as a high resolution power, it has poor ink absorptivity capacity and slow ink absorption rate. Hence the paper has the drawback that it is unsuitable for the multi-color printing of a large amount of ink and too expensive.

Recently, the demand of plain type papers excellent in the economics, paper-like figures and feeling is increased with high speed printing.

Incidentally, there are two trends in the plain type technology; one trend is disclosed, for example, in Japanese patent application laid-open publications sho 53-49113 and sho 58-8685. The former disclosed that water-soluble polymer is coated or impregnated into the sheet filled with urea-formalin resin, while the latter disclosed that a water-soluble polymer is coated on or impregnated into a sheet filled with synthetic silicate and/or glass fiber.

The feature of these ink jet recording sheets is that the high speed printing is possible owing to the ink absorbency improved by non-sizing paper filled with fine powder.

When the sheet of this type, which consists of only so-called "ink-receptive layer", is multi-color-printed with a large amount of ink, ink spreads to lateral direction, and ink dots are feathered and become large so that the resolution power is lowered. As ink also penetrates in the paper deeply, the optical density is reduced with the increase of the light scattering on the upper layer of the recording sheet. Besides these sheets have the drawback that ink causes the print through, that is, show through the strike through in the recorded parts.

The other trend is disclosed in Japanese patent application laid-open publications sho 60-27588 and sho 61-50795, for example. This trend is directed to control the spreading of inks on the paper by reducing ink-absorbency to some extent by weak sizing. According to sho 60-27588, a wet strength agent is added to the sheet and then a small amount of coating color is applied to the sheet, wherein Stöckigt sizing degree of the obtained sheet is controlled to below 3 seconds. According to sho 61-50795, a recording paper is produced by sizing with a petrochemically produced, emulsified resin-type size. In these ink jet recording papers, drawbacks of the afore-mentioned recording papers—the undesirable print through and spreading of inks—can be certainly reduced owing to the above sizing effect, but ink-absorbency becomes so poor that the obtained papers are fundamentally unsuitable for multi-color recording.

Further, Japanese patent application laid-open publication sho 55-150370 discloses an ink jet recording process by the use of the recording sheet having a stuff of synthetic pulp and wood pulp, or by the use of the recording sheet having the above stuff on a wood paper. In either case, however, synthetic pulp needs to melt in the paper surface by heat treatment after ink jet recording, so that this method needs a special machine only for the heat treatment. Without the heat treatment, the affinity of inks for synthetic pulp is so weak that the coloring in dots are uneven, wherein the uniform image is not obtained. Moreover, the problem is that the optical density is insufficient because of the light scattering occurring on the surface, and the sheet is inferior in paper-like figures and hand-feeling.

SUMMARY OF THE INVENTION

Under the circumstances, the present inventors made intensive studies to eliminate drawbacks of conventional ink jet recording papers and finally accomplished this invention by finding a novel ink jet recording paper, characterized by comprising a base layer that contains an internal size, and an ink-receptive layer that is made out of a material having good affinity for inks, wherein said ink-receptive layer is superposed on either one or both sides of said base layer by a multiply paper-manufacturing process. According to this invention, drawbacks of conventional ink jet recording papers can be all removed by layers, wherein the confronting properties are harmonized with each other. Accordingly, it is an object of this invention to provide an ink jet recording paper which gives uniform images and excellent optical density, provides a good ink-absorbency well fitted to multi-color recording, and lessens the print through. The above and other objects and features of this invention will appear more fully hereinafter from a consideration of the following description taken in connection with the accompanying drawing.

BRIEF DESCRIPTION OF THE DRAWING FIGURES

FIGS. 1 through 3 are a cross-sectional view of an ink jet recording paper of this invention, wherein the numeral 1 denotes the base layer and the numeral 2 denotes the ink-receptive layer.

DETAILED DESCRIPTION OF THE PREFERRED EMBODIMENT

Figure 1:
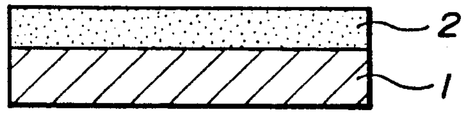

As seen from the drawing, an ink jet recording paper of this invention comprises a plurality of layers; that is, it is produced by superposing a plurality of ink-receptive layers either one or both sides of at least one base layer, or combining a base layer and an ink-receptive layer. A recording sheet having the desired property may be obtained by giving confronting properties to each of the layers, if necessary.

The function required for the base layer is mainly to prevent inks coming into the ink-receptive layer from further penetrating deeply and rapidly. Concretely, in order to achieve the function, the opacity and the sizing degree are important factors. To be exact, the opacity is desirable to be 75% and over, when measured according to JIS P8138 1976 (Reaffirmed: 1984); and the sizing degree measured in terms of the Stöckigt sizing degree is preferable to be 3 seconds and over, on condition that a base layer of 60 $g/m^2$ is measured according to JIS P8122 1976 (Reaffirmed: 1984) When the recording inks have passed through the ink-receptive layer and reached the base layer of which the opacity is 75% or over, show through which is observed from the back side of the ink jet recording paper, is reduced and hence the print through becomes lessened too. Also, in the case that the Stöckigt sizing degree is 3 seconds or over, inks having passed through the ink-receptive layer and reached the base layer are prevented from further penetrating into the base layer near its surface (strike through), with the result that the print through is improved. However, when the sizing degree is extremely high, and a large amount of ink is applied, the ink-receptive layer cannot afford to hold the ink anymore; when the sizing degree is too low, ink penetrates into the base layer so deeply that the print through becomes noticeable. Also, with the decrease of ink staying in the ink-receptive layer, the density declines, and the clearness of recorded images is reduced, which is undesirable. For these reasons, the sizing degree is desirable to be in a so-called weak sizing degree, although it has to be 3 seconds and over.

The ink-receptive layer has to be provided with good ink-absorbency enough to hold plentiful ink from multi-colored recording; additionally, it must be good in color-reproducibility, and can give uniform images and increased optical density. Therefore, the ink-receptive layer should consist of a material having good affinity for inks, and it should be a porous layer having a uniform thickness and higher transparency as described hereinafter. If the ink-receptive layer lacks in affinity with ink's solvents, not only will ink be not absorbed but also its drying is retarded, whereby the ink flows out or recorded images are so easily injured by abrasion that this kind of layer becomes unsuitable for multi-colored recording using plentiful ink. Likewise, if any material in the ink-receptive layer has little affinity for ink-dyes, the inks are not fixing in the material, whereby some portions in ink dots are not dying, with the result that uniform images cannot be produced. For these reasons, when an aqueous ink is used for the ink jet recording, the addition of more than a certain amount of sizing agent to the ink-receptive layer deteriorates the penetration and the drying of water as solvent, whereby the object of this invention cannot be fully accomplished. Likewise, if such material as synthetic pulp having little affinity for water and dyes is contained in the ink-receptive layer exceeding a certain quantitative limit, uniform images cannot be produced because the material leaves some portions in ink dots unfixed, which performs the object of this invention impossible.

Since the color inks are produced in accordance with the principle of the color substraction, it is unexpected that the less light scattering is in the ink-receptive layer, i.e., the more transparent the ink-receptive layer is, the better the ink's color reproducibility becomes and the clearer the images look.

When the surfaces of the recorded ink-receptive layer is exposed to a certain amount of light energy, the light energy is sufficiently absorbed. Thereby, the less the light is scattered, the better the color reproduction and the higher the color density become.

The base layer of this invention can comprise a cationic polymer, pulp, filler, internal size, a sizing agent, retention aid, and other auxiliary agents. Retention aids are defined in the "Pulp & Paper Dictionary" by J. Lavigne, 2nd Edition, Pulp and Paper Research Institute of Canada, Pointe Claire, Canada, as materials, such as vegetable gums, cationic starches, potato starch, sodium aluminate, colloidal animal glue, acrylamide resin, etc., added to the papermaking process at the paper machine headbox, fan pump, or other location close to the wire. They are added in small amounts for the express purpose of maximizing the retention of fillers by altering their electrical charge or bonding. The pulp mainly includes plant pulps, such as wood pulp and linter pulp, and recycled pulp from waste paper; however, it may include an inorganic fiber such as glass fiber, or synthetic pulp, for example, if necessary.

Among the fillers used in this invention are calcium carbonate, clay, activated clay, talc, silica, aluminum hydroxide, diatomaceous earth, barium sulfate, titanium dioxide, organic resinous pigment, and the like, all of which are commonly used in the paper-manufacturing or paper-converting factories. These are produced in many different grades, but this invention does not limit the use of any of them. Moreover, if necessary, a mixture of plurality of different fillers or a mixture of same filler of different grades can be used. In order to increase the opacity of the base layer, such fillers as titanium oxide and calcium carbonate that have high refractive index and can be atomized easily are preferable, and, in view of the availability and the economy, finely powdered precipitated calcium carbonate is the most preferable of all.

Used as the internal sizing agent are acid sizing agents such as fortified rosin size, petroleum resin size, and emulsion-type rosin size, and neutral sizing agents used in the paper manufacturing, such as alkylketene dimer and cationic size. In the selection of these sizing agents, there should be chosen the agents that hardly diffuse into the ink-receptive layer from the base layer. In this respect, if a diffusible one is employed, the ink-receptive layer becomes so water-repellent that its ink-absorbency deteriorates which is undesirable. Considering this, such sizing agents having a strong affinity with pulp and a high molecular weight is suitable for this aim; in this sense, styrene-acrylic cationic resin is desirable for this invention.

The ink-receptive layer of this invention comprises pulp, filler, retention aid, and auxiliary agent, such as water-soluble resin etc., which control the paper qualities or productivity. The pulp in the ink-receptive layer includes wood pulp, linter pulp, and recycled pulp from waste paper. Unlike the base layer, such pulp or fiber that has not affinity with ink's solvents or dyes cannot be used for the ink-receptive layer. Therefore, glass fiber or synthetic pulp, which may be mixed in the base layer, should not be mixed in the ink-receptive layer. A similar kind of fillers to those used in the base layer may be used for the ink-receptive layer as well. In selecting from those fillers, care must be taken in such a way as to increase the ink-absorbency and lessen the light scattering of the ink-receptive layer.

As for the transparency of the ink-receptive layer, fillers should not necessary be used. However, it is rather desirable to use filler so as to further increase the ink-absorbency, and control and spread and form of ink dots in order to give clear images, high color density and high resolution. In this connection, experiments revealed that ground calcium carbonate pulverized to medium size is more desirable than precipitated calcium carbonate or synthetic silica.

The reason for this is unclear yet, but it seems to the present inventors that very fine filler such as precipitated calcium carbonate and silica adheres to fiber and thereby increase the light scattering and reduce the transparency of the ink-receptive layer, whereas the medium-sized ground calcium carbonate does not deteriorate the transparency of the ink-receptive layer so much as the fine filler because it adheres to fiber less than they do, and most of them lie in a space between fibers.

The term "transparency", as far as it is used in this invention, means an extent to which incident light in the ink-receptive layer is scattered thereby; in this sense, the more incident light is scattered in the ink-receptive layer, the lower the transparency thereof becomes, whereby recorded images look whitish as much.

Thus, this transparency can be represented in terms of the specific light scattering coefficient (S) of the Kubelka-Munk equation, which indicates the degree of light scattering. In connection with the specific light scattering coefficient, wood pulp is 200–700 $cm^2/g$, synthetic pulp is 900–1300 $cm^2/g$, and fillers are 600–1000 $cm^2/g$ on the average. These values (S) differs with the kind of the materials by the treatment processes and or the particle size of material; therefore, some of the above-mentioned material sometimes indicate greater coefficient than their average.

The value (S) decreases with the increase of pulp beating degree; thus, in order to produce more vivid images by reducing light scattering in the ink-receptive layer, it is desirable to use high beating pulp. However, when the beating is too high, the vacant spaces for absorbing inks are decreased; in consequence, they reduce the ink-absorbency of the ink-receptive layer. From this point of view, excessively high beating is undesirable.

Among the water-soluble resins to be used in this invention are starch, cationic starch, polyvinylalcohol, gelatin, sodium alginate, hydroxyethylcellulose, carboxymethylcellulose, polyacrylamide, polystyrene sulfonate, polyacrylate, polydimethyldiallylammonium chloride, polyvinylbenzyltrimethylammonium chloride, polyvinylpyridine, polyvinylpyrrolidone, polyethyleneoxide, hydrolysis product of starch-acrylonitrile graftpolymer, polyethyleneimine, polyalkylenepolyaminedicyandiamideammonium condensate, polyvinylpyridinium halide, poly-(meth)acrylalkyl quaternary salts, poly-(meth)acrylamidealkyl quaternary salts and the like. Among these, cationic starch, whose aqueous solution shows low viscosity, polyacrylamide, polydimethyldiallylammonium chloride, and polyvinylpyrrolidone are particularly desirable for this invention. Among the retention aid to be used in this invention are vegetable gum, cationic starches, potato starches, sodium aluminate, colloidal animal glue, acrylamide resin, aluminum sulfate, styrene-acrylic resin, polyethyleneimine, modified polyethylene-imine, polyethyleneimine quaternary salt, carboxylated polyacrylamide partially aminated polyacrylamide, acid addition compounds of partially aminomethylated polyacrylamide, acid addition compounds of partially methylolated polyacrylamide, epichlorohydrin resin, polyamide epichlorohydrin resin, formalin resin, modified polyacrylamide resin and the like.

It is desirable to coat or saturate the ink-receptive layer with a solution or dispersion of fine filler in order to produce clearer images and higher density. Alumina, aluminum hydroxide, silicate, and silica are desirable for this purpose, and among these, synthetic silica is the best of all. Therefore, synthetic silica, obtained by the precipitation process, the gel process, and the vapor phase process, can be used as fine silica. In any case, when the specific surface area of silica, determined by the B.E.T. method, is equal to or greater than 150 $m^2/g$, and the particle size distribution thereof is of the narrowest possible, images of high color density are produced.

In the case that such kind of fillers are used for coating or impregnating method, a water-soluble resin or latex as a binder can be added to them. Additionally, such additives as a viscosity control agent, an agent for giving recorded images of a water-resistance, or an agent for controlling the spread of dots can also be mixed in their coating color.

Among the water-soluble resin mentioned above are starch, cationic starch, polyvinylalcohol, gelatin, alginate, hydroxyethylcellulose, carboxymethylcellulose, polyacrylamide, polystyrene sulfonate, polyacrylate, polyvinylpyridine, polyvinylpyrrolidone, polyethyleneoxide, hydrolysis product of starch-acrylonitrile graftpolymer and the like. Among these substances, a high water-absorptive water-soluble resin can effectively be used to improve not only the surface binding strength but also the ink-absorbency of the ink-absorbency of the ink-receptive layer. Employing a large amount of latex provides the poor ink-absorbency, but the coating of the ink-receptive layer with so much latex as not to deteriorate the ink-absorbency is effective in order to improve the surface binding strength and the water-resistance of the ink-receptive layer.

As the water resistance agent, there re polyethyleneimine, polydimethyldiallylammonium salt, polyalkylenepolyaminedicyandiamideammonium condensate, polyvinylpyridinium halide, poly-(meth)acrylalkyl quaternary salts, poly-(meth)acrylamidealkyl quaternary salts, polyvinylbenzyltrimethylammonium, ω-chloro-poly(oxyethylenepolymethylene-trialkylammonium salt), and the like, which produce a complex in association with dyes in inks. Because the specific light scattering coefficient of the ink-receptive layer having greater than 500 $cm^2/g$ provides the lower color density and whitish recorded images, it is, therefore, desirable to take good care so that the specific light scattering coefficient of the ink-receptive layer stays not greater than 500 $cm^2/g$ by adjusting the mixing ratio of a filler and a binder or the amount thereof.

Particularly, in the case that fine silica is used as a filler, an image having a sufficient ink-absorbency and high optical density and clear color is obtained by coating or impregnating the ink-receptive layer with 0.5–10 $g/m^2$ or preferably 1–5 $g/m^2$ of the silica. If, however, their amount to coat or impregnate with exceeds 5 $g/m^2$, the surface strength declines so that the fillers come off or the depth of ink's penetration into the ink-receptive layer increases, whereby the optical density tends to decrease.

Figure 2:
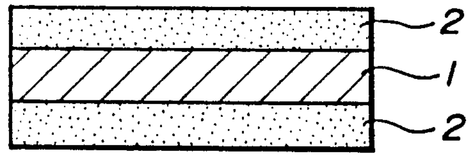
Figure 3:
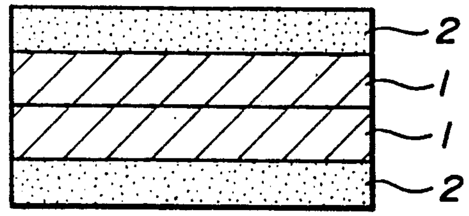

When an ink jet recording paper with more than one layer is produced according to this invention, materials for both the ink-receptive and the base layers are prepared respectively in advance, from which a multi-ply sheet is manufactured, for example, a two, three, or four ply sheet as shown in FIG. 1 through 3, by the use of cylinder vat-type paper-manufacturing machines, such as Suction Former and Ultra Former, or On-Top-Twin-Former type paper manufacturing machines, such as Arcu-Former (produced by Tampella AB, OY), Ultra-Twin-Former (produced by Kabushiki Kaisha Kobayashi Seisakusho), and Alladin-Former (produced by Sanki Tekko Kabushiki Kaisha).

As stated so far, according to this invention, there is produced a multi-ply ink jet recording paper by superposing an ink-receptive layer, composed only of a material having good affinity for inks, on either one or both sides of a comparatively ink-unabsorbable base layer. The structure of the ink jet recording paper being such that, when ink ejected from a printer has reached the surface of the ink-receptive layer, the ink is rapidly absorbed and penetrated into the layer because of its good affinity for inks solvents and dyes, and high porosity. The ink, having passed through the ink-receptive layer, reaches to the surface of the base layer; however, because it is sized, the further penetration of the ink is hindered by the surface of the base layer. For these reasons, the optical density of the ink jet recording paper is improved, and the print through, and wrinkles by the absorption of inks are prevented.

Because the degree of print through depends upon the physical ink penetration depth and the visually ink penetration depth (show through), the show through can be improved by increasing the opacity of the base layer to more than a certain level, and thereby the print through can be improved more widely.

Contrary to this, by reducing the specific light scattering coefficient of the ink-receptive layer, recorded images become vivid and superior in the reproducibility of original colors.

In order to be provided with better ink-absorbency and higher optical density, the ink-receptive layer had better be coated or impregnated with a solution or dispersion of a filler having a comparatively large specific surface area. Being supported with a comparatively ink-unpenetrable base layer, sufficient ink-absorbency and good optical density can be imparted to the ink-receptive layer by coating or impregnating it with lesser amount of a coating color.

If a single sheet of recording paper would be conventionally treated with size from the view of improving the print-through, inks would hardly penetrate in the recording paper whatever weak sizing may be applied, and this would give inferior ink-absorbency and ink-dryability thereby would not fit to a high speed color printing machine. Also, if the higher porosity of sheet would be used from the view of improving ink-absorbency, too much ink would penetrate up to the back side of the recording paper, and thereby the print through would be terrible. If a sheet of recording paper would be coated with a filler to improving ink-absorbency, the recording paper would lose a desirable paper-like figures and become economically uncompetitive with its production cost. According to this invention, however, the layers of confronting properties are effectively selected, and thereby the harmonized multi-ply recording paper is obtained.

In this invention, ink-penetration preventive agent may be coated on the surface of a base layer which is not contacted with the ink-receptive layer, wherein there can be obtained an excellent ink jet recording paper corresponding to a conventional recording paper of heavy-coat type coated with much ink-absorptive filler owing to the decreased wrinkles and the improved recording aptitude.

The ink-penetration preventive agent of this invention includes, for example, so-called surface sizing agents, hydrophobic agents for preventing the penetration of aqueous ink, low hydrophilic agents, the coating agents thereof.

The surface sizing agents include, for example, acid sizing agents such as fortified rosin size, petroleum resin size, emulsion-type rosin size, alkenyl succinic acid neutral paper-manufacturing, such as alkylketene dimer, alkyl succinic anhydride; cationic resin sizing agent; anionic or cationic acrylamides; and the like. These surface sizing agents can be applied with water-soluble resins, such as starch, polyvinyl alcohol, etc. The viscosity of the coating material is controlled to 5-2000 C. P., in order to prevent an extreme penetration into a base layer. The addition amount of the materials and the coating amount thereof are controlled so that the whole recording sheet has a Stöckigt sizing degree of 3 seconds and over, wherein they are easily determined by experiments.

And an ink-penetration preventive agent can be applied for forming an ink-penetration preventive layer, wherein a resin emulsion having a superior film forming ability, such as SBR-latex, ethylene-vinylacetate latex, acrylic latex, etc., is applied onto a base layer. For an additional improvement of the hiding power in the print through, it is desirable that a filler is added into an ink-penetration preventive agent. As this filler, there are mentioned white fine pigments, such as titanium dioxide, calcium carbonate, kaolin, etc. Usually, the above sizing agent for usual papers can be added into the coating material. In the addition of the filler, a dispersing agent is always used, wherein the dispersing agent includes, for example, anionic dispersing agents, such as sodium polyacrylate, ammonium polyacrylate, sodium pyrophosphate, etc., cationic dispersing agents, such as cationic polyvinyl alcohol, polyaminoamido fatty acid-compound, low molecular cationic galactomannan, etc.

In the coating material for forming a film, it is desirable to increase the viscosity of a coating.

In order to improve the print through and the hiding power, it is desirable to use the coating material in an amount of 3–20 $g/m^2$, preferably 5–15 $g/m^2$. The mixing ratio of the raw material for a coating is controlled so that the recording sheet has a Stöckigt sizing degree of 3 seconds and over.

As the methods for coating the ink-penetration preventive agent of this invention, there are mentioned a size press system, a coater system such as roll coater, blade coater, bar coater, etc., and a spray system.

In order that this invention may be more clearly understood, reference will now be made to the following examples; however, the examples are only to illustrate this invention and not to be construed to limit this invention.

In the examples, part means part by weight calculated in terms of the solid content of respective agents unless otherwise described.

EXAMPLE 1

100 parts of LBKP (hardwood bleached kraft pulp), whose freeness (CSF) were 300 ml, was used as a material for the base layer. 20 parts of a filler (calcite-group precipitated calcium carbonate, spindle shape, 50% mean particle size: 4.1 μm, BET specific surface area: 5 $m^2/g$), 0.2 parts of size A (polystyrene-acrylate quaternary ammonium salts), and 0.02 parts of retention aid agent M (cationic polyacrylamide, viscosity: 590 c.p.s. at 0.5% consistency) were added thereto. A base layer of the weight 60 $g/m^2$ was manufactured by the use of a square, hand-made paper manufacturing test machine (produced by Tozai Seiki Kabushiki Kaisha), and kept standing in the condition before pressing.

Subsequently, 0.02 parts of the same retention aid M as used for the base layer were added to 100 parts of LBKP of 300 ml freeness, and an ink-receptive layer of the weight 30 $g/m_2$ was produced by the use of the same paper manufacturing test machine as used for the base layer. The ink-receptive layer was laid on the base layer; according to the hand-made paper manufacturing test procedure JIS P8209, they were dehydrated and pressed and then dried. As a result, a two-ply ink jet recording paper of the weight 90 $g/m^2$ was obtained.

EXAMPLES 2, 3 AND 4, AND COMPARATIVE EXAMPLE 1

In Examples 2, 3 and 4, only the amount of size A was changed to 1.0, 0.5 and 0.05 parts respectively. In Comparative Example 1, only size A was omitted.

As apparent from Table 1, the higher the sizing degree is, the higher the color density is. At the same time, the print-through is improved considerably because their penetration is prevented. In the sheet of Comparative Example 1 having its base layer containing no such sizing agent, even if it is a two-ply sheet, inks having passed through the ink-receptive layer penetrate in the base layer deeply. For this reason, the image density becomes weak, and the penetration of inks increased so greatly that the sheet of Comparative Example 1 cannot be put to practical use. Notwithstanding, the ink-absorbency, the image resolution, color uniformity, and hand-feeling are all good.

COMPARATIVE EXAMPLES 2 AND 3

Used for the ink-receptive layer were 100 parts of LBKP of 300 ml freeness, to which 10 parts of calcite group ground calcium carbonate (amorphous type, 50% mean particle size: 4.6 μm, BET specific surface area: 3.4 $m^2/g$), and 0.02 parts of retention aid M, the same one as used in Example 1, were added. An ink-receptive layer of the weight 90 $g/m^2$ was produced as Comparative Example 2 by the use of the square, hand-made paper manufacturing test machine used in Example 1.

Separately, a two-ply ink jet recording paper was produced as Comparative Example 3 in the same way as in Example 1, except that 0.2 parts of cationic polymer size A were mixed in the ink-receptive layer of Example 1.

As obvious from Table 1, Comparative Example 2 shows such terrible strike through and as a result it cannot be put to practical use, because of worse print through. Even if it is a two-ply, Comparative Example 3 contains the sizing agent in both the ink-receptive and the base layers, so that inks are not allowed to spread properly, the apparent density is too low, and the ink-absorbency is so poor that there appears in part the flowing-out of inks.

EXAMPLES 5 AND 6

An ink jet recording paper of Example 5 was produced in the same way as in Example 1, except that its base layer was prepared from 80 parts of LBKP of 350 ml freeness, 20 parts of NBKP (softwood bleached kraft pulp) of 250 ml freeness, and 0.2 parts of size B (alkylketene dimer, consistency: 15.5%, viscosity: 80 c.p.s.).

Separately, another ink jet recording paper of Example 6 was produced in the same way as in example 5, except that 100 parts of LBKP of 280 ml freeness were used for the base layer, in place of LBKP in Example 5.

As clearly seen from Table 2, the print-through becomes slightly noticeable with the increase of the base layer's transparency. Nevertheless, there is recognized almost no change in the ink-absorbency, hand-feeling and density.

EXAMPLES 7, 8, 9, AND 10

Ink jet recording papers of Examples 7 and 8 were produced in the same way as in Example 1, except that 100 parts of LBKP of 250 ml freeness, and 100 parts of NBKP of 200 ml freeness were used respectively for the ink-receptive layer, in place of LBKP in Example 1.

Another ink jet recording paper of Example 9 was produced in the same way as in Example 1, except that 20 parts of calcite group precipitated calcium carbonate (spindle shape, 50% mean particle size: 4.1 μm, BET specific surface area: 5 $m^2/g$) were added to 100 parts of the pulp to produce an ink-receptive layer, and 0.15 parts of size C (alkenyl-succinic anhydride, a reactive neutral size, viscosity: 420 c.p.s., specific gravity: 0.95), 1 part of aluminum sulfate, and 0.5 parts of retention aid N (cationic starch CATO F, produced by Ohji National Co.) were added to 100 parts of the pulp to produce a base layer.

Still another ink jet recording paper of Example 10 was produced in the same way as in Example 1, except that 10 parts of calcite group ground calcium carbonate (amorphous type, 50% mean particle size: 4.4 μm, BET specific surface area: 3.5 $m^2/g$) were added to the pulp to produce an ink-receptive layer, and 20 parts of kaolin (kaolinite group, spherical aggregate, mean primary particle size: 0.1 μm, specific gravity: 2.2), 0.15 parts of fortified rosin size D (Coropal CS, produced by Seiko Kagaku Kogyo Co.), and 1.0 part of aluminum sulfate were added to 100 parts of the pulp to produce a base layer.

As apparent from Table 3, the light scattering coefficient of the ink-receptive layer declines, the transparency thereof increases, and the density of images increases. As the light scattering coefficient exceeds 500 $cm^2/g$, recorded images begin to look whitish, and the density begins to decrease.

COMPARATIVE EXAMPLE 4

An ink jet recording paper was produced in the same way as in Example 1, except that 43 parts of synthetic pulp (polyethylene, mean fiber length: 1.6 mm, freeness: 300 ml) were added to 100 parts of the pulp to produce an ink-receptive layer.

As shown in Table 3, the use of synthetic pulp provides the increased light scattering coefficient of the ink-receptive layer and the extremely decreased density. Also, in an observation at recorded images, there are unfixed area in ink dots, whereby images lack in image uniformity.

EXAMPLES 11, 12 AND 13

Added to 1430 parts of water were 100 parts of fine silica produced by the precipitated process (50% mean particle size: 2.7 μm, BET specific surface area: 270 $m^2/g$), 67 parts of 28% cationic resin aqueous solution (polydimethyldiallylammonium chloride, mean molecular weight: 120,000), as an agent for giving images water-resistance, and 50 parts of 10% PVA aqueous solution (saponification degree: ca. 99%, mean polymerization degree: 1700), as a binder. In this case an impregnating solution of 8% total solid content was produced. The ink-receptive layer prepared in Example 1 was coated with this impregnating solution in order to produce the solid content of 2 $g/m^2$. An ink jet recording paper thus produced was numbered with Example 11.

Another ink jet recording paper of Examples 12 and 13 were produced in the same way as in Example 1, except that the silica produced by the precipitated process was replaced with silica produced by the gel process (50% mean particle size: 12 μm, BET specific surface area: 320 $m^2/g$) and silica produced by the vapor process (mean primary particle size: ca. 12 nm, BET specific surface area: 200 $m^2/g$), respectively.

As apparent from Table 4, the thin coating (impregnating) of the ink-receptive layer with silica provides the widely increased density. It also improves the color reproduce whereby there appear brilliant images.

EXAMPLE 14

Similarly in Example 1, a first ink-receptive layer of the weight 30 $g/m^2$, a first base layer of the weight 30 $g/m^2$, a second base layer of the weight 30 $g/m^2$, and a second ink-receptive layer of the weight 30 $g/m^2$, and a second ink-receptive layer of the weight 30 $g/m^2$ were laid one on another in this order, and a multi-ply ink jet recording paper of the weight 120 $g/m^2$ was obtained, as shown in FIG. 3. Meanwhile, the freeness of LBKP used for each of the layers is 300 ml.

Both sides of the ink jet recording sheet are superior in ink-absorbency, resolution, and optical density. At the same time, the recording paper shows no print through, and had a good hand-feeling.

Items of the result in Table 1 to 4 are assessed as follows:

(1) Opacity and specific light scattering coefficient:

The normalization of the Hunter reflectometer (produced by Kabushiki Kaisha Toyo Seiki Seisakusho) is made according to the Hunter's Brightness test method JIS P8123 by the use of a green filter. The reflection of the respective sample recording papers backed with the standard white plate ($R_{0.89}$) and the reflection of the same sample recording sheet backed with the standard black plate ($R_0$) are measured, and they are put in the following equation in order to obtain the opacity thereof.

$$\text{Opacity} = \frac{R_0}{R_{0.89}} \times 100\ (\%)$$

The specific light scattering coefficient can also be obtained from $R_0$ and $R_{0.89}$ by the use of the following Kubelka-Munk equations (1) and (2):

$$S = \frac{1}{W(1/R_\infty - R_\infty)} \ln \frac{(1 - R_0 R_\infty)}{(1 - R_0/R_\infty)} \quad (1)$$

W: weight of a sheet of recording paper per one square meter ($g/m^2$)

$R_0$: reflection index of a sheet of recording paper backed with a black plate $R_\infty$: reflection index of a sheet of recording paper having a sufficient thickness $R_\infty$ can be calculated by using the following equation:

$$R_\infty = (-b + \sqrt{b^2 - 4a^2})/2a \quad (2)$$

where $$a = -0.89 C_{0.89} R_0,$$

$$b = 0.89 C_{0.89} + C_{0.89} R_0 - 0.89 R_0, \text{ and}$$

$$C_{0.89} = \frac{R_0}{R_{0.89}}$$

The opacity and the specific light scattering coefficient of each of the base and the ink-receptive layers are measured. For the measurement of the opacity, the weight of each of the sample layers is made 60 $g/m^2$, and for the measurement of the specific light scattering coefficient, it is made 90 $g/m^2$.

(2) Recorded optical density:

A solid colored area, 1.5 cm wide×2.0 cm size, is marked on the respective sample recording sheet with black, cyan, magenta, and yellow by the use of Sharp Color-image Printer IO-700.

The density on the area is measured by the use of Macbeth RD 915, produced by Kollmorgen Corporation. The respective color densities of the four colors are summed up, and given in Table 1. The recording paper giving a total color density of 3.3 and above are assessed as "good".

(3) Print through:

The print through of the respective sample recording papers is assessed according to the following assessment criterion by inspecting the reverse side of recorded images.

- Assessment A: No strike through, almost no show through observed.
- Assessment B: No strike through, slight show through observed
- Assessment C: Almost no strike through, but terrible show through observed
- Assessment D: Strike through, and terrible show through observed As is apparent from the above detailed description, this invention comprises superposing an ink-receptive layer of good ink affinity on either or both sides of a base layer containing a sizing agent, so that a multi-ply sheet, i.e. a novel superior ink jet recording paper, of desirable hand feeling and good ink-absorbency is produced.

Further, the ink jet recording paper of this invention provides excellent resolution power, uniform dot size and high color density, with no print through, which have so far been obtained by a conventional coated type ink jet recording paper.

Furthermore, the recording paper of this invention can be produced by using an ordinary paper manufacturing machine and, if necessary, a simple-structured on-machine treatment.

In addition, the recording paper of this invention has lots of such advantages that great improvement can be expected in both production operation and economy.

TABLE 1

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Composition | | | | | | | |
| Ink-receptive layer | | | | | | | |
| LBKP | 100 | 100 | 100 | 100 | 100 | 100 | 100 |
| Group $CaCO_3$ | | | | | | 10 | |
| Size | | | | | | | A 0.2 |
| Retention aid | M 0.02 | M 0.02 | M 0.02 | M 0.02 | M 0.02 | M 0.02 | M 0.02 |
| Base Layer | | | | | | | |
| LBKP | 100 | 100 | 100 | 100 | 100 | | 100 |
| Precipitated $CaCO_3$ | 20 | 20 | 20 | 20 | 20 | | 20 |
| Size | A 0.2 | A 1.0 | A 0.5 | A 0.05 | | | A 0.2 |
| Retention aid | M 0.02 | M 0.02 | M 0.02 | M 0.02 | M 0.02 | | M 0.02 |
| Assessment | | | | | | | |
| Ink-receptive layer | | | | | | | |
| Spec. light scattering coef. | 462 | 462 | 462 | 462 | 462 | 491 | 462 |
| Base layer | | | | | | | |
| Opacity (%) | 84.9 | 84.9 | 84.9 | 84.9 | 84.9 | | 84.9 |
| Size (Sec.) | 5 | 28 | 16 | 2 | 0 | | 5 |
| Assessment | | | | | | | |
| Optical Density | 3.63 | 3.85 | 3.74 | 3.56 | 3.51 | 3.46 | 2.35 |
| Print through | A | A | A | B | C | D | A |

TABLE 2

| | Ex. 1 | Ex. 5 | Ex. 6 |
|---|---|---|---|
| Composition | | | |
| Ink-receptive layer | | | |
| LBKP | 100 | 100 | 100 |
| Retention aid | M 0.02 | M 0.02 | M 0.02 |
| Base Layer | | | |
| LBKP | 100 | 80 | 100 |
| NBKP | | 20 | |
| Precipitated $CaCO_3$ | 20 | | |
| Size | A 0.2 | B 0.2 | B 0.2 |
| Retention aid | M 0.02 | M 0.02 | M 0.02 |
| Assessment | | | |
| Ink-receptive layer | | | |
| Spec. light scattering coef. | 462 | 462 | 462 |
| Base layer | | | |
| Opacity (%) | 84.9 | 71.0 | 78.2 |
| Size (Sec.) | 5 | 8 | 7 |
| Assessment | | | |
| Optical Density | 3.63 | 3.68 | 3.65 |
| Print through | A | B | A |

TABLE 3

TABLE 3-continued

| | Ex. 1 | Ex. 7 | Ex. 8 | Ex. 9 | Ex. 10 | Comp. Ex. 4 |
|---|---|---|---|---|---|---|
| Composition | | | | | | |
| Ink-receptive layer | | | | | | |
| LBKP | 100 | 100 | | 100 | 100 | 100 |
| NBKP | | | 100 | | | |
| Synthetic pulp | | | | | | 43 |
| Ground $CaCO_3$ | | | | | 10 | |
| Precipitated $CaCO_3$ | | | | 20 | | |
| Retention aid | M 0.02 | M 0.02 | M 0.02 | M 0.02 | M 0.02 | M 0.02 |
| Base Layer | | | | | | |
| LBKP | 100 | 100 | 100 | 100 | 100 | 100 |
| Precipitated CaCo$_3$ | 20 | 20 | 20 | 20 | | 20 |
| Kaolin | | | | | 20 | |
| Size | A 0.2 | A 0.2 | A 0.2 | C 0.15 | D 0.15 | A 0.2 |
| Retention aid | M 0.02 | M 0.02 | M 0.02 | N 0.5 | | M 0.02 |
| Aluminum sulfate | | | | 1 | 1 | |
| Assessment | | | | | | |
| Ink-receptive layer | | | | | | |
| Spec. light scattering coef. | 462 | 376 | 219 | 548 | 491 | 706 |
| Base layer | | | | | | |
| Opacity (%) | 84.9 | 84.9 | 84.9 | 84.9 | 83.9 | 84.9 |
| Size (Sec.) | 5 | 5 | 5 | 5 | 7 | 5 |
| Assessment | | | | | | |
| Optical Density | 3.63 | 3.68 | 4.29 | 3.32 | 3.44 | 2.79 |
| Print through | A | A | A | A | A | A |

TABLE 4

| | Ex. 1 | Ex. 11 | Ex. 12 | Ex. 13 | Ex. 14 | |
|---|---|---|---|---|---|---|
| | | | | | 1st | 2nd |
| Composition | | | | | | |
| Ink-receptive layer | | | | | | |
| LBKP | 100 | 100 | 100 | 100 | 100 | 100 |
| Group $CaCO_3$ | | | | | 5 | |
| Retention aid | M 0.02 | M 0.02 | M 0.02 | M 0.02 | M 0.02 | M 0.02 |
| Base Layer | | | | | | |
| LBKP | 100 | 100 | 100 | 100 | 100 | 100 |
| Ground $CaCO_3$ | | | | | 20 | |
| Precipitated | 20 | 20 | 20 | 20 | | 10 |

TABLE 4-continued

| | Ex. 1 | Ex. 11 | Ex. 12 | Ex. 13 | Ex. 14 1st | Ex. 14 2nd |
|---|---|---|---|---|---|---|
| $CaCO_3$ | | | | | | |
| Size | A 0.2 | A 0.2 | A 0.2 | A 0.2 | A 0.2 | A 0.2 |
| Retention aid | M 0.02 | M 0.02 | M 0.02 | M 0.02 | M 0.02 | M 0.02 |
| Assessment | | | | | | |
| Ink-receptive layer | | | | | | |
| Spec. light scattering coef. | 462 | 462 | 462 | 462 | 476 | 462 |
| Base layer | | | | | | |
| Opacity (%) | 84.9 | 84.9 | 84.9 | 84.9 | 83.8 | 83.0 |
| Size (Sec.) | 5 | 5 | 5 | 5 | 5 | 5 |
| Assessment | | | | | | |
| Optical density | 3.63 | 4.12 | 3.80 | 4.45 | 3.50 | 3.65 |
| Print through | A | A | A | A | A | A |

EXAMPLE 15

The mixed pulp of 80 parts of LBKP (hardwood bleached kraft pulp) having 350 m CSF (Canadian Standard Freeness) and 20 parts of NBKP having 450 ml CSF was used as a pulp for the base layer. 20 parts of a filler (calcite-group precipitated calcium carbonate, spindle shape, 50% mean particle size: 4.1 μm, BET specific surface area: 5 $m^2/g$) and 0.02 parts of a retention acid M (cationic polyacrylamide, 590 C.P. at 0.5% consistency) were added thereto to prepare a base layer slurry.

On the other hand, the mixture of 100 parts of LBKP (350 ml CSF), 10 parts of a filler (calcite-group ground calcium carbonate, amorphous type, 50% mean particle size: 4.6 μm, BET specific surface area: 3.4 $m^2/g$), 0.02 parts of a retention aid M (cationic polyacrylamine, 59 C.P.S. at 0.5% consistency) was used to prepare an ink receptive layer slurry.

A base layer of weight of 45 $g/m^2$ and an ink receptive layer of the weight of 30 $g/m^2$ were manufactured separately, using a base layer slurry and an ink receptive layer slurry.

The both layers were laid one on another in a wet state, so that a two-ply ink jet recording paper of 75 $g/m^2$ was produced by a Cylinder-Fourdrinier multiple-layer manufacturing machine.

An ink-penetration preventive layer was applied onto the surface of a base layer which is not contacted with the ink-receptive layer. The coating material for an ink-penetration preventive layer was prepared by mixing 10 parts of titanium dioxide (anatase-type, specific gravity: 3.9, 50% mean particle size: 0.3 μm) containing a dispersing agent with 50 parts of SBR-latex, and by diluting to 35% consistency with water. The resultant coating material was applied onto a base layer in a coating weight of 10 $g/m^2$ (as solid) by Meyer bar to produce a recording sheet of Example 15.

EXAMPLE 16

A mixed pulp of 80 parts of LBKP (350 ml CSF) and 20 parts of NBKP (450 ml CSF) was used as a pulp of a base layer. 20 parts of filler (kaolin, kaolinite-group, spherical aggregate, 50% mean primary particle size: 0.1 μm, specific gravity: 2.2) and 0.3 parts of a retention aid (polyamide epichlorohydrin resin) and 1.5 parts of aluminum sulfate were added thereto to prepare a base layer slurry. On the other hand, 100 parts of LBKP (350 ml CSF) and 1.5 parts of aluminum sulfate were mixed to prepare an ink receptive layer slurry. A two-ply ink jet recording paper of 90 $g/m^2$ weight (composed of a base layer of 60 $g/m^2$ weight and an ink-receptive layer of 30 $g/m^2$ weight) was produced by a Cylinder-Fourdrinier multiple-layer manufacturing machine.

An ink-penetration preventive layer was applied onto the surface of a base layer which is not contacted with the ink-receptive layer. The coating material for an ink penetration preventive layer was prepared from 20 parts of a surface active agent (anionic styrene acrylic acid copolymer, Hama-coat S-700, manufactured by Misawa-Ceramic Chemical Co.) and 80 parts of oxidized starch, and it was applied onto a base layer in a coating amount of 2.5 $g/m^2$ (as solid) by a sizing press system to produce a recording sheet of Example 16. The ink-penetration preventive agent prevents an ink-penetration by impregnating somewhat into a base layer.

EXAMPLE 17

A mixed pulp of 80 parts of LBKP (350 ml CSF) and 20 parts of NBKP (450 ml CSF) was used as a pulp of a base layer. 20 parts of filler (calcite-group precipitated calcium carbonate, spindle shape, 50% mean particle size: 4.1 μm, BET specific surface: 5 $m^2/g$), 0.05 parts of an internal sizing agent (alkylketene dimer, cationic, pH-value: 3.0, viscosity: 30 C.P.S.), 0.3 parts of a wet strength-increasing agent (polyamide epichloro hydrin) and 0.02 parts of a retention aid M were added thereto to prepare a base layer slurry.

On the other hand, 100 parts of LBKP (350 m CSF), 10 parts of a filler (calcite-group precipitated calcium carbonate, amorphous type, 50% mean particle size: 4.6 μm, BET specific surface: 3.4 $m^2/g$), 0.3 parts of a wet strength-increasing agent (polyamide epichlorohydrin) and 0.02 parts of retention aid M were mixed to prepare an ink-receptive laid slurry. A base layer of 45 $g/m^2$ weight and an ink-receptive layer of 35 $g/m^2$ weight were prepared separately, and were laid one on another in a wet state so that a two-ply ink jet recording paper of 80 $g/m^2$ was produced by a Cylinder-Fourdrinier multiple-layer manufacturing machine.

An ink-penetration preventive layer was applied onto the surface of a base layer which was not contacted with an ink-receptive layer. The coating material for an ink-penetration preventive layer was prepared by mixing 100 parts of titanium dioxide (anatase-type, specific gravity: 3.9, 50% mean particle size: 0.3 μm) containing a dispersing agent with 50 parts of SBR-latex and a diluting to 35% consistency with water. The resultant coating material was applied onto a base layer in a coating amount of 10 $g/m^2$ (as solid) by Meyer bar to produce a recording sheet of Example 7.

EXAMPLE 18

A mixed pulp of 80 parts of LBKP (350 ml CSF) and 20 parts of NBKP (450 ml CSF) was used as a pulp of a base layer. 20 parts of a filler (kaolin, kaolinite-group, spherical aggregate, 50% mean primary particle size: 0.1 μm, specific gravity: 2.2), 1.5 parts of ω-chloro-poly(oxyethylene-polymethylene-alkyl quaternary ammonium salt) and 1.5 parts of aluminum sulfate were added thereto to prepare a base layer slurry. A base layer of 60 $g/m^2$ weight was manufactured by the use of a square, hand-made paper manufacturing machine (produced by Jozai Seiki Kabushiki Kaisha), and kept in the condition before pressing.

Subsequently, 100 parts of LBKP (350 m CSF) and 1.5 parts of aluminum sulfate were mixed to prepare an ink-receptive layer slurry. An ink-receptive layer of 30 $g/m^2$ weight was produced by the use of the same paper manufacturing machine as used for the base layer.

An ink-penetration preventive layer was applied onto the surface of a base layer which was not contacted with an ink-receptive layer. The coating material for an ink-penetration preventive layer was prepared by mixing 50 parts of a surface sizing agent (anionic styrene acrylic acid copolymer, Hama-coat S-700, manufactured by Misawa-Ceramic Chemical Co.) and 50 parts of an oxidized starch and by diluting to 9% consistency with water. The resultant coating material was applied onto a base layer in a coating amount of 3.5 $g/m^2$ (as solid) by Meyer bar and dried to prepare a recording sheet of Example 18.

COMPARATIVE EXAMPLE 5

A mixed pulp of 100 parts of LBKP (350 ml CSF), 20 parts of kaolin (kaolinite-group, spherical aggregate, 50% mean primary particle size: 0.1 μm, specific gravity: 2.2) and 1.5 parts of aluminum sulfate were used to prepare a slurry. From the slurry, an ink-jet recording paper of Comparative Example 5 (90 $g/m^2$ weight) was produced by sheet-making, pressing and drying in a usual procedure under the use of a square, hand-made paper manufacturing machine (produced by Tozai Seiki Kabushiki Kaisha).

COMPARATIVE EXAMPLE 6

20 parts of a filler (calcite-group precipitated calcium carbonate, spindle type, 50% mean particle size: 4.1 μm, BET specific surface: 5 $m^2/g$), 0.05 parts of an internal sizing agent (alkylketene dimer, cationic, pH-value: 30, viscosity: 30 C.P.S.) and 0.02 parts of a retention aid M were added to 100 parts of LBKP (350 ml CSF) as a pulp to prepare a slurry. From the slurry, an ink-jet recording paper (90 $g/m^2$) of Comparative Example 6 was produced by sheet-making, pressing and drying in a usual procedure under the use of the square, hand-made paper manufacturing machine.

COMPARATIVE EXAMPLE 7

20 parts of a filler (kaoline, kaolinite-group spherical aggregate, 50% mean primary particle size: 0.1 μm, specific gravity: 2.2), 1.5 parts of aluminum sulfate were added to 100 parts of LBKP (350 ml CSF) as pulp to prepare a slurry. From the slurry, a paper of 90 $g/m^2$ was manufactured in the same manner as in Comparative Example 5. 50 parts of a surface sizing agent (anionic styrene acrylic acid copolymer, Hama-coat S-700, manufactured by Misawa-Ceramic Chemical Co.) and 50 parts of an oxidized starch were mixed, and they were diluted to 9% consistency with water to obtain a coating material. The obtained coating material was coated on the above paper in a coating amount of about 2.5 $g/m^2$ (as solid) by Meyer bar, and it was dried to produce an ink-jet recording paper of Comparative Example 7.

The ink-jet recording papers of Examples 15–18 and Comparative Examples 5–7 were tested, and the test results were indicated in Table 5. In this case, "bleeding" was tested as follows.

Using a sharp ink-jet color image printer 10-700, all over records (size: 1.5 cm×2.0 cm) of three colors (cyan, magenta and yellow) were made successively. At the time, the degree of running of neighboring inks to each other or one side was evaluated as follows:

| |
|---|
| A . . . Not bleeding |
| B . . . Some bleeding |
| C . . . Remarkable bleeding |

TABLE 5

| | Ex. 15 | Ex. 16 | Ex. 17 | Ex. 18 | Comp. Ex. 5 | Comp. Ex. 6 | Comp. Ex. 7 |
|---|---|---|---|---|---|---|---|
| (1) Optical density | 3.72 | 3.68 | 3.61 | 3.57 | 3.20 | 2.37 | 2.42 |
| (2) Print through | A | A | A | A | D | A | A |
| (3) Bleeding | A | A | A | A | A | C | C |

What is claimed is:

1. An ink jet recording paper comprising a paper layer that contains an internal sizing agent, and an ink-receptive layer comprising a material having good affinity for inks and consisting of pulp other than synthetic pulp, filler, and at least one substance selected from the group consisting of starch, polyvinylalcohol, gelatin, sodium alginate, hydroxyethylcellulose, carboxymethylcellulose, polyacrylamide, polystyrene sulfonate, polyacrylate, polydimethyldiallylammonium chloride, polyvinylbenzyltrimethylammonium chloride, polyvinylpyridine, polyvinylpyrrolidone, polyethyleneoxide, hydrolysis product of starch-acrylonitrile graftpolymer, polyethyleneimine, polyalkylene-polyaminedicyandiamideammonium condensate, polyvinylpyridinium halide, poly-(meth)acrylalkyl quaternary salts, poly-(meth)acrylamidealkyl quaternary salts, vegetable gum, colloidal animal glue, aluminum sulfate, styrene-acrylic resin, polyethylene-imine quaternary salt, epichlorohydrin resin, polyamide epichlorohydrin resin, formalin resin carboxylated polyacrylamide, partially aminated polyacrylamide, acid addition compound of partially aminomethylated polyacrylamide and acid addition compound of partially methylolated polyacrylamide, wherein said paper layer has an opacity of 75% or over and a Stockigt sizing degree of 3 seconds or over, and, wherein said ink-receptive layer is superposed on either one or both sides of said paper layer by a multi-ply paper-manufacturing process.

2. The ink jet recording paper as set forth in claim 1, wherein the specific light scattering coefficient of said ink-receptive layer is not greater than 500 $cm^2/g$.

3. The ink jet recording paper as set forth in claim 1, wherein said ink-receptive layer is coated or impregnated with fine silica at a rate of 0.5 to 10 $g/m^2$.

4. The ink jet recording paper as set forth in claim 3, wherein said solution of fine silica further comprises at least one additional agent selected from the group consisting of polyethylene imine, polydimethyldiallylammonium chloride, polyalkylene-polyaminedicyandiamideammonium condensate, polyvinylpyridinium halide, poly-(meth)acrylalkyl quaternary salts, poly-(meth)acrylamidealkyl quaternary salts, polyvinylbenzyltrimethylammonium and ω-chloro-poly(oxyethylene polymethylene-trialkylammonium salt).

5. The ink jet recording paper as set forth in claim 1, wherein said paper layer comprises pulp, filler, internal size and retention aids.

6. The ink jet recording paper as set forth in claim 5, wherein said filler of said paper layer is at least one member selected from the group consisting of calcium carbonate, clay, talc, silica, aluminum hydroxide, diatomaceous earth, barium sulfate, titanium oxide and organic resinous pigment.

7. The ink jet recording paper as set forth in claim 5, wherein said filler of said paper layer is finely powdered precipitated calcium carbonate.

8. The ink jet recording paper as set forth in claim 1, wherein said filler of said ink-receptive layer is at least one member selected from the group consisting of calcium carbonate, clay, talc, silica, aluminum hydroxide, diatomaceous earth, barium sulfate, titanium dioxide and organic resinous pigment.

9. The ink jet recording paper as set forth in claim 1, wherein said filler of said ink-receptive layer is ground calcium carbonate pulverized to medium size.

10. An ink jet recording paper as set forth in claim 1, wherein an ink-penetration preventive agent is applied onto the surface of said paper layer which is not contacted with said ink-receptive layer.

11. An ink jet recording paper as set forth in claim 10, wherein said paper layer comprises a sizing agent.

12. An ink jet recording paper as set forth in claim 10, wherein said paper layer comprises a cationic polymer.

13. The ink jet recording paper as set forth in claim 1, wherein said starch is cationic starch.

14. The ink jet recording paper as set forth in claim 6, wherein said clay is activated clay.

15. The ink jet recording paper as set forth in claim 8, wherein said clay is activated clay.

* * * * *

UNITED STATES PATENT AND TRADEMARK OFFICE

CERTIFICATE OF CORRECTION

PATENT NO. : 5,180,624

DATED : January 19, 1993

INVENTOR(S) : Yutaka Kojima, et. al.

It is certified that error appears in the above-indentified patent and that said Letters Patent is hereby corrected as shown below:

Title page, item [63], under Related U.S. Application Data, line 3, delete "Pat. No. 4,877,978" and insert --abandoned--; and in item [30], under Foreign Application Priority Data, line 1, delete "2-36692" and insert --236692/87--.

Signed and Sealed this

Thirtieth Day of August, 1994

Attest:

Bruce Lehman

BRUCE LEHMAN

*Attesting Officer*

*Commissioner of Patents and Trademarks*